Nov. 11, 1969   A. H. SCHWENDTNER   3,477,606
MEMBRANE TANK STRUCTURES
Filed March 25, 1965   3 Sheets-Sheet 1
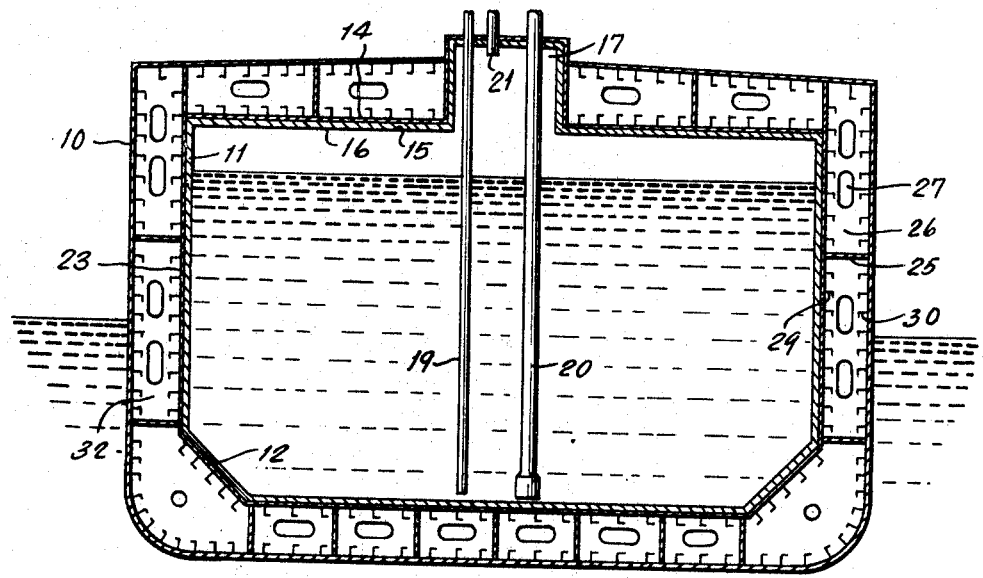
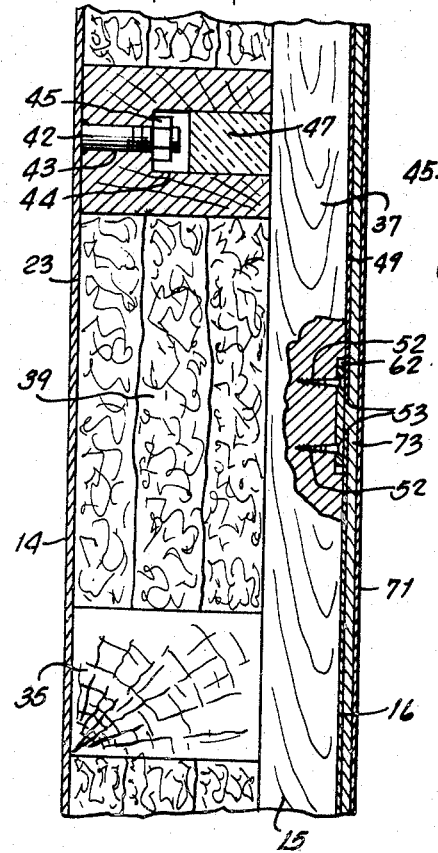
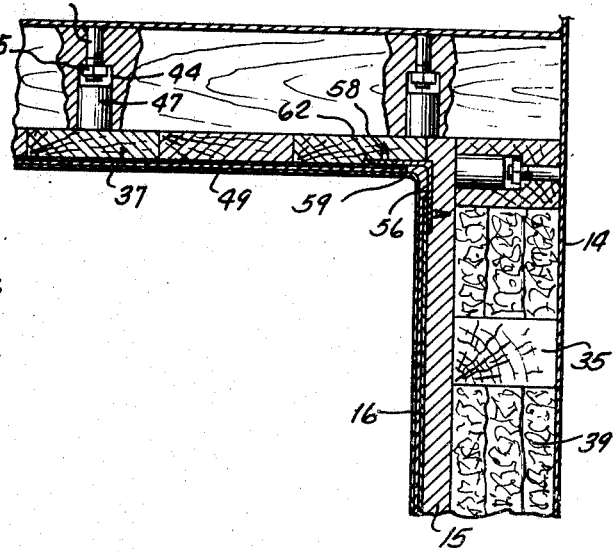
INVENTOR.
ALFRED H. SCHWENDTNER
BY
Robert S. Dunham
ATTORNEY

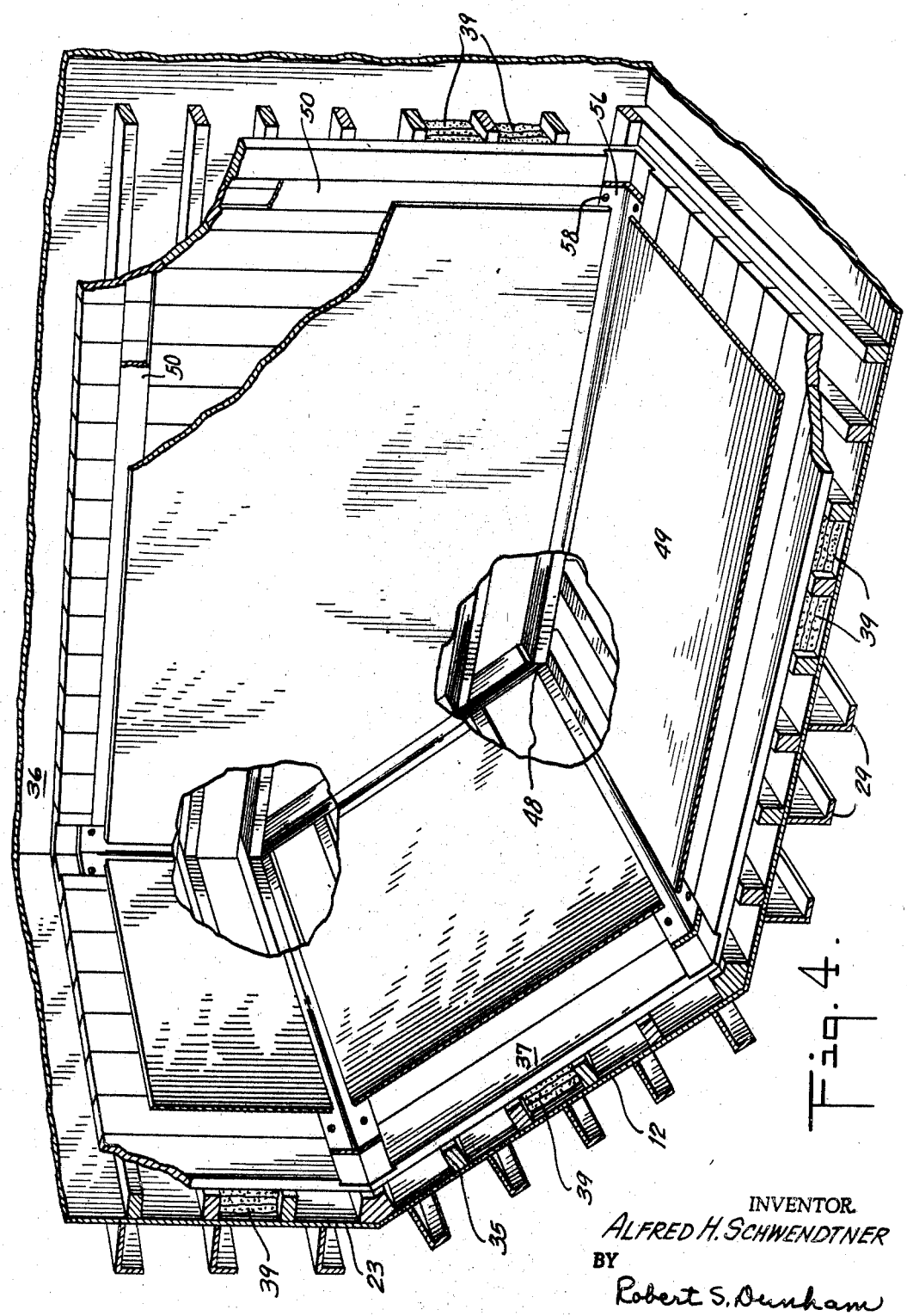

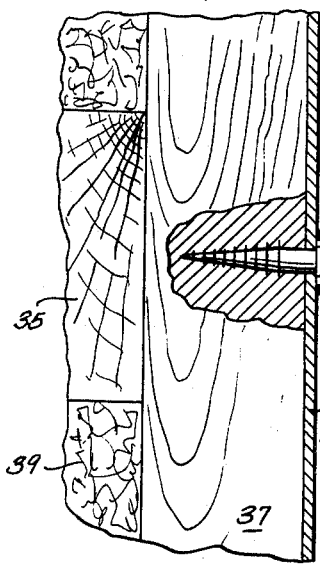
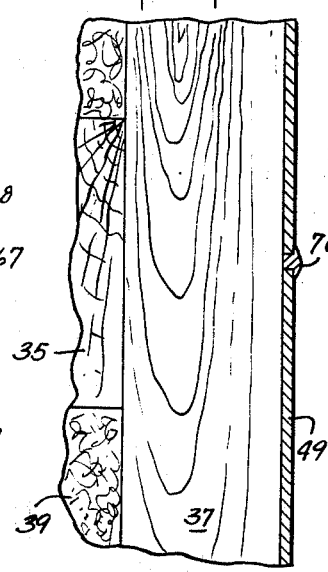
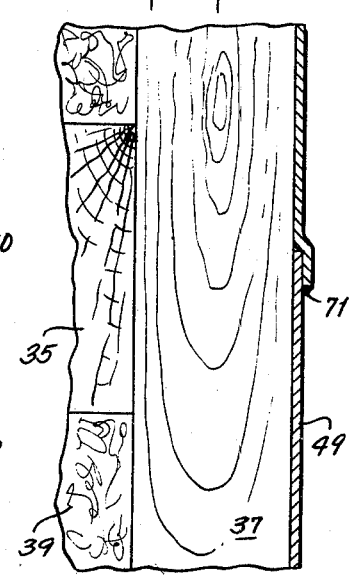
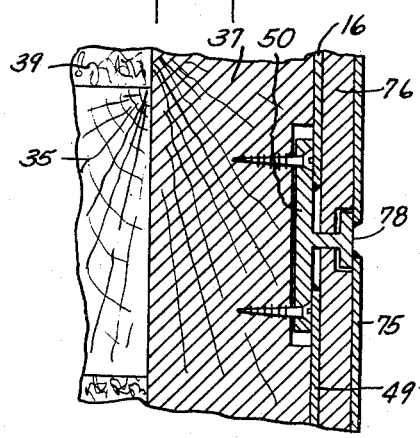
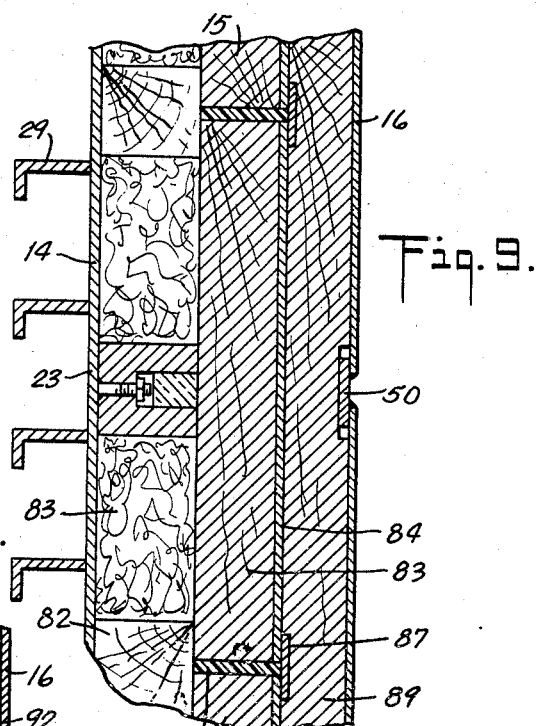
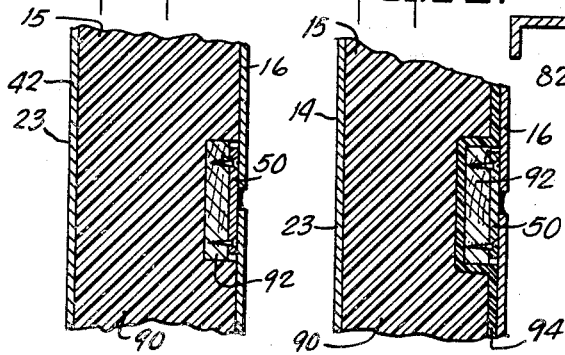

United States Patent Office

3,477,606
Patented Nov. 11, 1969

3,477,606
MEMBRANE TANK STRUCTURES
Alfred H. Schwendtner, New York, N.Y., assignor, by mesne assignments, to Conch International Methane Limited, Nassau, Bahamas, a Bahamian company
Filed Mar. 25, 1965, Ser. No. 442,657
Int. Cl. B65d 25/16, 25/18
U.S. Cl. 220—9                                6 Claims

ABSTRACT OF THE DISCLOSURE

A membrane tank structure for storing and transporting cryogenic liquids such as liquefied methane gas, of the type in which a load-bearing insulating shell supports a thin, liquid-impervious membrane liner. Thermal expansion and contraction problems are solved by using for the insulating shell (or at least for its inner face) a material having a thermal stress, for the temperature range between ambient and that of the cryogenic liquid, substanitally lower than the ultimate strength of the material, and for the membrane, using a thin, smooth, uncorrugated low-expansion sheet material in direct contact with and fully restrained against the inner face of the insulating shell, so that substantially no relative movement between the two occurs under large temperature changes and the sheet does not buckle.

---

This invention relates to tanks for containing fluids such as liquefied methane and the like at very low temperatures, and more particularly to so-called membrane tanks for such fluids. In an important specific aspect the invention is directed to membrane tank structures built into marine vessels, i.e. tankers, for transporting liquefied methane or other very cold fluids.

In the transportation of methane by marine vessels such as seagoing tankers, the methane is carried in large tanks in liquefied state at a temperature about equal to its boiling point at 1 atm. (−258° F.). The low temperature is miantained by allowing some of the gas to boil off during transport; in this way heat is removed from the liquid as heat of vaporization, and accordingly it is not necessary to provide elevated pressure in the tanks to keep the methane in liquefied state, although the tanks are ordinarily maintained at a pressure slightly above atmospheric pressure to prevent air from entering the tanks.

The temperature conditions encountered in transporting liquid methane present special problems with regard to tank design. The methane must be well insulated from the hull of the ship, not only to minimize transfer of heat to the liquid, but also to prevent excessive cooling of the hull; otherwise the liquid methane (which has a high cooling capacity owing to the fact that it is transported at a temperature of about −258° F.) would tend to cool the hull to a temperature at which metals ordinarily used in ship hull construction become brittle. Furthermore, in order to deliver the maximum cargo it is preferred to empty the tanks completely at the port of destination and to allow the tanks on the return voyage to warm up from −258° F. to ambient temperature (e.g. +70° F.) due to natural heat leak into the tanks. If a cargo of ambient-temperature liquid is available to be carried in the tanks on the return voyage it is evident that the tanks will necessarily reach ambient temperature. Thus in this type of operation of a liquefied methane tanker, the tanks are ordinarily subjected to a change of temperature from −258° F. to about +70° F. on each round trip, and accordingly the tanks must be designed not only to withstand the very low temperature of liquefied methane but also to withstand these large-magnitude changes in temperature which impose thermal stresses on the tanks as the tank materials undergo expansion and contraction in response to the temperature variations.

Liquefied methane has heretofore been carried in tankers in rigid, thick-walled, self-supporting tanks fabricated of metals that do not become embrittled at liquid-methane temperatures and having internal or external insulation, these tanks being separated from the tanker hull to allow for thermal expansion and contraction. Conventional rigid methane tanks normally are required to retain some liquid methane on board after unloading in order to minimize the warm-up on the return voyage. All tanks must of course occasionally be opened up for inspection and maintenance purposes; the subsequent cooldown (i.e. to liquid methane temperature) on a rigid tank must be carefully controlled in order to avoid excessive thermal stresses.

It has also been proposed to transport liquid methane in so-called membrane tanks, in which the methane is contained within a thin, non-self supporting, fluid-impervious metal membrane supported and insulated by a surrounding outer shell which is in turn mounted directly in the hull structure of the vessel itself. These membrane tanks have important advantages over the rigid metal tanks described above, especially in that they afford substantial savings in cost and weight because much less metal is required for their construction than for the rigid tanks, e.g. 20 to 50 times less metal for an equivalent tank volume.

However, in membrane tanks as heretofore proposed, e.g. having membranes of stainless steel or aluminum, it has been necessary to allow at least localized movement of the membrane relative to the supporting shell, in order to absorb thermal exapnsion and contraction of the membrane, since the temperature changes encountered in liquid methane tanks would produce thermal stresses in these membranes in excess of their yield strength if the membranes were fully restrained. Thus, in particular, to avoid rupture of the membranes due to such temperature changes, it has been necessary to provide membranes having a corrugated or dished contour and secured to the outer shell only at separated, protruding localities of the membrane surface, so that thermal expansion and contraction are absorbed in the unsecured portions of the dished or corrugated surface.

For various reasons, it would be desirable to obviate the necessity of providing the latter surface contours in liquefied methane tank membranes. In the first place, the fabrication of dished or corrugated membranes is costly, and requires more metal than would a flat membrane of equal area. Secondly, the installation of such membranes is inconvenient; the membranes are assembled by welding together sheets of the membrane material and in the case of dished or corrugated membranes this involves welding along a curved surface or a convoluted edge which is much more difficult to perform than welding along a straight edge, and less adaptable to machine welding. Moreover, the design of tank corners is difficult because it is necessary to allow for expansion in three directions at the corners. Finally, even with corrugation or dishing, the membranes have high stresses at some points, e.g. at the points of the folds, which limit the life of the membrane.

It is accordingly an object of the present invention to provide a new and improved metal membrane tank structure which is significantly less expensive, easier to fabricate and install, and which affords greater safety against rupture and leakage than the dished and corrugated membrane tank structures heretofore proposed. Another object is to provide a metal membrane tank structure built into a tanker vessel for transporting liquid methane or other low-temperature fluid, capable of withstanding temperature variations between liquid methane temperature and ordinary ambient temperatures without provision of dishing or corrugation in the membrane.

Further objects and advantages of the invention will be apparent from the detailed description hereinbelow set forth, together with the accompanying drawings, wherein:

FIG. 1 is a simplified transverse sectional view of a tanker for transporting liquefied methane or other low-temperature fluid, having a membrane tank structure in accordance with the present invention;

FIG. 2 is a fragmentary sectional view of the wall structure of one form of tank embodying the invention;

FIG. 3 is a fragmentary sectional view of one corner of the tank of FIG. 2;

FIG. 4 is a fragmentary perspective view, partly broken away, of the interior of the tank of FIG. 2;

FIG. 5 is a fragmentary sectional view illustrating an alternative arrangement for securing the tank membrane to the supporting structure in the tank of FIG. 2;

FIG. 6 is a fragmentary sectional view illustrating a modified form of joint between sheets of the membrane in the tank of FIG. 2;

FIG. 7 is a fragmentary sectional view showing another arrangement for such joints;

FIG. 8 is a fragmentary sectional view showing an alternative form of primary barrier for the tank of FIG. 2;

FIG. 9 is a fragmentary sectional view of a modified form of tank wall structure in accordance with the invention;

FIG. 10 is a fragmentary sectional view of another alternative tank wall structure in accordance with the invention; and FIG. 11 is a fragmentary sectional view illustrating a modified form of the wall structure of FIG. 10.

Referring first to FIG. 1, there is shown a tanker, e.g. of conventional design, having an outer hull 10 within which is positioned a tank 11 in accordance with the present invention for containing liquid methane or other low-temperature fluid. This tank, as illustrated, is a flat-walled enclosure of generally rectangular or parallelpiped configuration with bilges 12 at its lower corner (in some cases having bilge-shaped upper corners as well), and broadly comprises an outer shell 14 spaced on all sides from the hull 10, an inner shell 15 secured to the outer shell, providing insulation and having an inner substantially non-resilient flat surface, and a membrane 16 providing a fluid-impervious, non-self-supporting inner lining for the latter surface, all as hereinafter more fully described. An extension 17 of the tank projects upwardly from the top of the tank through the deck of the tanker to provide a mounting for a fill pipe 19, pump discharge 20, and gas vent 21. The fill pipe and pump discharge both extend into the lower portion of the tank, and are respectively adapted to be associated with suitable means (not shown) for supplying to and withdrawing from the tank the fluid to be transported; normally the pumping arrangement employed to discharge the fluid utilizes a deep-well pump or submerged pump. The vent 21, opening into the extension 17, is adapted to withdraw from the tank gases e.g. produced by vaporization from the liquid therein. The tanker may be provided with two or more such tanks, substantially identical in construction and arrangement, and disposed in spaced relation along the long axis of the tanker. The tank dimensions are determined by the size of the tanker and the arrangement of tanks therein; as one example, a large tank may be 150 feet long (along the tanker axis), 110 feet wide, and 70 feet deep.

The sides, top and bottom of the outer shell 14 are provided by longitudinal bulkheads 23, which are secured in fixed spaced relation to the outer hull 10 by spaced longitudinal plates 25 and spaced transverse web frames 26 having apertures 27 for passage of personnel for inspection as well as smaller fluid-passage apertures (not shown). To enhance the rigidity of the bulkheads against the outward force of liquid in the tank 12, the bulkhead outer surfaces bear against stiffeners 29 secured and extending longitudinally between the web frames 26, similar stiffeners 30 being provided for the outer hull 10. The ends of the outer shell 14 are provided by transverse bulkheads (not shown in FIG. 1) also rigidly secured to the outer hull 10.

As will therefore be appreciated, the outer tank shell 14 is an integral part of the tanker hull structure, so that the hull structure (including the shell 14) itself constitutes the load-bearing structure of the tank. The bulkheads and associated supporting members comprising the shell 14 are individually conventional structural elements well-known in the shipbuilding art; these bulkheads, as well as the supporting plates, frames and stiffeners and the outer hull 10 may conveniently be fabricated of metals, such as steel, conventionally used for ship construction. The spaces between the outer shell 14 and the hull 10 constitute a plurality of wing tanks 32; regardless of whether the main tanks are loaded or unloaded, these wing tanks may be left empty or may be filled with salt water as ballast or with conventional liquid cargoes, e.g. petroleum.

The inner shell 15 is built into the outer shell 14 (and fixedly secured thereto) in load-transmitting engagement with the inner surface of the outer shell, to constitute, in effect, a layer of thermal insulation within the shell 14 providing flat and substantially non-resilient inner membrane-backing surfaces, facing the interior of the tank and completely surrounding the tank interior. This shell 15 may be either simple or composite in nature as illustrated by the examples of construction hereinafter described, and may be fabricated of material or materials having, in general, the following characteristics: low thermal conductivity, i.e. good heat-insulation properties; load-bearing properties (ability to withstand compression) sufficient to be substantially non-resilient, i.e. to undergo no substantial deformation under the compression forces exerted by a full load of liquefied methane in the tank; and an ultimate strength substantially greater than the fully restrained thermal stress under the temperature conditions encountered in the tank. A variety of non-metallic materials are suitable for this purpose; examples of suitable materials providing such properties are wood and non-resilient organic foams. One especially suitable wood, providing both insulating and load-bearing properties, is balsa wood, which has a thermal stress when fully restrained (for the temperature range of interest) of 325 p.s.i. and an ultimate strength of 2,500 p.s.i. Another suitable wood is beech, having a thermal stress of 1,742 p.s.i. (for the latter temperature range) and an ultimate strength of 14,900 p.s.i. A further suitable material is polyurethane foam, one type of such foam having a thermal stress of 3.3 p.s.i. and ultimate strength of 42 p.s.i., and another type of such foam having a thermal stress of 28.4 p.s.i. and an ultimate strength of 110 p.s.i.

The membrane 16, in accordance with the present invention, is fabricated of a low-expansion iron-nickel alloy. The term "low-expansion iron-nickel alloy" is employed herein to refer to alloys consisting essentially of iron and nickel having a nickel content in a range of about 30% to about 42%, and is intended to define alloys having a low coefficient of expansion as is understood by this class of alloys. Alloys so defined are intended to signify similar alloys wherein cobalt is substituted for part of the nickel as is well-known and understood in the art, the amount of cobalt so substituted being ordinarily or commonly in a range up to about 5% cobalt. As will further be understood, these low-expansion iron-nickel alloys can have the usual small amounts of modifying ingredients, for example such as manganese and selenium, without affecting their properties for the purpose of this invention.

For the range of temperatures between liquid-methane temperature and ambient temperature (about $-260°$ F. to about $+70°$ F.), the low-expansion iron-nickel alloys as defined above have very low thermal coefficients of expansion, viz. coefficients in a range of about $0.75 \times 10^{-6}$ in./in./° F. to about $3.5 \times 10^{-6}$ in./in./° F. (depending on the proportionate composition of the alloy), and have moduli of elasticity in a range between about $21 \times 10^6$ and about $22 \times 10^6$ lb./in.$^2$. In particular, over the temperature range of interest the fully-restrained thermal stress of these alloys is much lower than their yield strength or ultimate strength.

It is particularly prefererd to use, for the membrane 16, low-expansion iron-nickel alloys as defined above having a nickel content of between about 34% and about 36%, e.g. Invar and Nilvar alloys. Alloys having a nickel content in the latter range have especially low thermal coefficients of expansion and thus exhibit particularly low fully-restrained thermal stresses in relation to yield strength and ultimate strength. As one example of an especially suitable material, an alloy containing about 35% Ni and 65% Fe has a modulus of elasticity of $21 \times 10^6$ lb./in.$^2$ and a thermal coefficient of expansion of $0.75 \times 10^{-6}$ in./in./° F. (as contrasted with stainless steel, for example, which has a coefficient of expansion of $7.5 \times 10^{-6}$); for the temperature range of interest ($-260°$ F. to $+70°$ F.) the fully restrained thermal stress of the latter (35% Ni) alloy is 5,200 p.s.i., whereas the yield strength is 40,000 p.s.i. and ultimate strength is 71,000 p.s.i. Another example of a suitable material, again having a particularly low thermal coefficient of expansion, is an alloy containing approximately 31% Ni, 4% Co, 65% Fe.

In the tank structure of the invention, the membrane 16 is a non-self-supporting structure made up of thin, flat, flexible sheets of low-expansion iron-nickel alloy joined to each other by joints of low-expansion iron-nickel alloy, so as to provide a fluid-impervious lining for the inner shell 15 completely surrounding the interior of the tank, including the extension 17. These sheets may be supplied in fairly large size, e.g. 6' x 20', and assembled full-size or cut to the shape to accommodate tank dimensions and configuration. It is presently preferred to use for this purpose alloy sheets having a thickness between about .002 inch and about 1/8 inch, a convenient exemplary range of thicknesses being between about .02 inch and about 1/16 inch. The membrane 16 is laid up flat against the inner non-resilient surfaces of the shell 15, i.e. in substantially continuous engagement with these surfaces, and is fixedly secured to the latter surfaces so as to be fully restrained thereby. Thus as the temperature of the tank varies between liquid methane temperature (about $-258°$ F.) and ambient temperature (e.g. $+70°$ F.) the membrane undergoes substantially no localized movement by expansion or contraction.

In this connection it may be explained that because low-expansion iron-nickel alloys have a fully-restrained thermal stress much lower than yield strength, under the temperature conditions encountered in a liquefied methane tank, a membrane of such alloy may be fully restrained (i.e. secured to the backing surface in flat, fully extended condition having no dishes or corrugations to accommodate expansion and contraction) without being susceptible to rupture. That is to say, by virtue of the use of a low-expansion iron-nickel alloy, the necessity for corrugation or dishing of the membrane (to absorb thermal contraction and expansion) is obviated. By thus using a flat membrane fully restrained by the tank inner shell, material costs for the membrane are decreased; membrane design and installation are greatly facilitated; and the membrane lifetime is very significantly enhanced, with concomitant increase in safety against leakage, because points of high stress in the membrane (such as folds in corrugations) are eliminated. In this way there is provided a tank structure of advantageously light weight and low cost, integral with (i.e. built into) the tanker hull structure, and having desirably improved assurance against rupture or leakage.

In the tank of FIG. 1, other metal structural elements exposed to the temperature conditions within the tank and connected to the tank walls (such as the pipe inlets at the top of the tank, and the flanges and other supporting structures therefor) may similarly be fabricated of low-expansion iron-nickel alloy, taking advantage of the low thermal coefficient of expansion of these alloys, so that the joints between these elements and the tank remain fluid-impervious over the full range of tank temperatures and also to minimize thermal stresses at such points.

Further in accordance with the invention, there may be provided in combination with the described low-expansion iron-nickel alloy membrane a second fluid-impervious barrier for the tank, as required by present regulatory provisions governing the transport of liquefied methane and the like in marine carriers. For example, the inner shell 15 may itself be constituted as a fluid-impervious barrier, or a second fluid-tight membrane (not shown in FIG. 1) may be provided within the membrane 16.

In use, the tank shown in FIG. 1 is filled with liquefied methane or other low-temperature fluid, pumped through fill pipe 19 preferably to a high level therein, providing a small gas space above the liquid for collection of gas evaporated from the liquid. The liquid load is not supported by the membrane, but is transmitted therethrough (and thence through the inner shell 15) to the hull structure (which, as stated, constitutes the load-bearing structure of the tank), and hence the membrane need not be of any particular thickness to withstand the compression forces of the liquid. Accordingly, the lower limit of thickness for the membrane is the minimum thickness that can be satisfactorily welded and handled. Since the membrane is on the inner surface of the shell 15, the compression forces of the liquid (and also the preferably slightly superatmospheric pressure above the liquid in the tank) tend to force the membrane against the non-resilient inner surfaces of the shell 15, maintaining the desired engaging relation between the membrane and the latter surface (i.e. contributing to the full restraint of the membrane) and avoiding any possibility of rupture of the membrane by pressure exerted against the membrane.

During transport, gas evaporates from the liquefied methane in the tank, absorbing heat and thus maintaining the desired temperature conditions therein; this gas is withdrawn through vent pipe 21. At the port of destination, the methane is pumped out of the tank by deep-well pump or other means through pump discharge 20, and the tank is then allowed to warm up to ambient temperature on the return trip. Because thermal stresses are very low in the present tank there is no need to maintain a part of the liquid methane cargo on board for the return voyage or for careful cool-down procedures after the tank has warmed up to ambient temperature.

Referring now to FIGS. 2-4, there is shown a specific form of tank wall construction embodying the present invention. In this embodiment, the inner shell 15 is of a composite construction, and includes spaced parallel timbers or beams of wood 35, bolted to the inner surface of each of the longitudinal bulkheads 23 and transverse bulkheads 36 (FIG. 4) comprising the outer tank shell 14 so as to provide a supporting frame structure within the outer shell. The inner non-resilient membrane-backing surfaces of the shell 15 are provided by wood planking 37, secured to the timbers 35 and constituting inner walls completely surrounding the interior of the tank. For thermal insulation, the spaces between the timbers 35 are filled up with suitable heat-insulating material such as bats 39 e.g. of fiberglass or polyurethane foam.

As a particular example of the construction of the shell 15 shown in FIGS. 2-4, the timbers 35 may be 6" x 9" laminated (three-ply) wooden beams, spaced apart 24 inches on centers, and secured to the outer shell 14 by bolts 42 (spaced 24 inches on centers) welded to and protruding inwardly from the bulkheads forming the outer shell. The bolts extend part-way into the timbers through holes 43, drilled in the timbers, which communicate with larger recesses 44 opening in the other side of the timbers; nuts 45 are threaded on the bolts in the recesses 44 to hold the timbers in place, and the recesses 44 are then packed up with fiberglass plugs 47 to insulate the bolts from the interior of the tank and thereby to reduce heat conduction into the tank through the bolts. As shown in FIG. 4, the timbers are formed with chamfer corners 48 at the top and bottom of the tank.

Fiberglass bats 39 are placed between the timbers 35. 3″ x 12″ wood planking is secured to the timbers to provide the inner load-bearing surface of the shell 15, the actual thickness of such planking being approximately 2⅝ inches. Any suitable structural wood, for example such as Douglas fir, may be used for the timbers and planking. Such woods provide the requisite load-bearing and thermal stress vs. ultimate strength characteristics for the shell 15, and are also relatively low in thermal conductivity; the thermal-insulative properties of the shell are in this example enhanced by the spacing of the planking 37 from the outer shell 14 and the filling of thermal insulation bats 39 in this space.

In the exemplary embodiment of FIGS. 2–4, the membrane 16 is comprised of large, thin (e.g. ¹⁄₁₆″), flexible flat sheets 49 of low-expansion iron-nickel alloy laid up against the inner surface of the planking 37 and joined by fluid-tight low-expansion iron-nickel alloy joints. The joints between sheets on a flat wall of the tank are provided by 5″ x ⅜₁₆″ low-expansion iron-nickel alloy flat bars 50 inserted in recesses in the wood planking so as to be substantially flush with the planking surface. These bars 50 are secured to the wood planking 37 by countersunk wood screws 52 located adjacent the side edges of the bars. The sheets 49 lap the bars 50, covering the heads of screws 52, and are welded thereto with low-expansion iron-nickel alloy as indicated at 53; while separate weld lines for the two sheets lapping the alloy bar 50 are shown, the sheets may be brought into contiguous relation and a single weld, i.e. a butt weld, made between the two sheets and the bar.

As will now be seen, in such arrangement the bars and weld lines provide a fluid-tight low-expansion iron-nickel alloy joint between the sheets 49, the bars serving as backing strips for the membrane; since the sheets cover the screws 52, there is no leakage around the screw heads. The attachment of the bars 50 to the wood planking 37 rigidly secures the sheets of the membrane to the planking and fully restrains the membrane; if desired, the sheets may also be glued to the planking intermediate the bars 50.

As more particularly shown in FIG. 3, at the corners of the tank the membrane sheets 49 are secured to low-expansion iron-nickel alloy angle members 56 (e.g. 6″ x 6″ x ¼″ L members) also fitted into recesses in the planking 37 and secured thereto by countersunk wood screws 58. The sheets 49 lap the angle member 56 so as to cover the screwheads and are welded to the member 56 with low-expansion iron-nickel alloy welds, indicated at 59. The angle members, as will be appreciated, cooperate with the flat bars 50 to secure the membrane in fully-restrained condition to the planking 37.

If desired, the membrane in localized areas of the tank may be formed of slightly thicker alloy sheets (e.g. ¼″ sheet) to facilitate the fastening of pipes, pumps or other internal structures such as ladders.

As illustrated in FIGS. 2 and 3, in providing the recesses in the planking for receiving the afore-mentioned flat bars and angle members, the wood is routed out oversize (i.e. to a width greater than that of the received alloy bars and members) to provide continuous spaces 62 extending along the outer side of the membranes adjacent the joints between sheets. These spaces are arranged to communicate with localities external to the tank, and provide passages for gas, e.g. to facilitate "vacuum box" testing of the tank for fluid tightness, and also to vent gas from the tank walls in case of leakage at the joints. In addition, the gas in these spaces may be continuously monitored during transport of liquefied methane to determine the presence of methane indicating joint leakage.

In assembling the tank structure of FIGS. 2–4, the hull structure including the bulkheads providing the outer shell 14 is first constructed, bolts 42 being welded to the inner surface of the latter shell. The timbers 35 are then installed, with insulation bats 39 placed between them. Thereafter, the wooden planking 37 is secured to the timbers to provide a complete inner wall for the tank; portions of the inner planking surface are routed out to receive the flat bars 50 and angle members 56. Finally, after the latter bars and angle members are screwed in place, the alloy sheets 49 are positioned and welded to form the membrane 16.

While the use of flat bar backing strips and angle members for the membrane joints as shown in FIGS. 2–4 represents a convenient and easily constructed arrangement for joining the membrane sheets and securing the same to the planking 37, either or both may be dispensed with. For example, the membrane sheets may simply be glued to the planking 37, or may be secured thereto by bolts 67 (as shown in FIG. 5) extending through the membrane itself into the wood, with a low-expansion iron-nickel alloy weld 68 around the bolt head for assured fluid-tightness. In such case, the sheets may be joined directly to each other by simple butt-welds 70 of the low-expansion iron-nickel alloy (as shown in FIG. 6) or by lap-welds 71 of such alloy (as shown in FIG. 7).

The membrane structure thus provided by any of the foregoing arrangements constitutes a continuous, flat, fluid-impervious inner lining for the tank completely surrounding the interior of the tank. It may constitute either the primary fluid-tight barrier for the tank, or a secondary barrier, in cases where a double barrier is provided in accordane with present regulatory provisions as noted above.

In the tank structure of FIGS. 2–4, the inner shell 15 (built up of timbers 35, planking 37 and insulation 39) is not fluid-impervious, and accordingly to provide a double-barrier construction a second fluid-impervious membrane (also completely enclosing the interior of the tank) is mounted within the membrane 16 which then becomes the secondary barrier of the tank. The second membrane, illustrated at 71 in FIG. 2, may be a fluid-tight bag fabricated of laminated sheets of Mylar film, a polyethylene terephthalate film. Mylar film is a tough, strong material having a low thermal stress (3,470 p.s.i. over the temperature range encountered in the present tank) relative to its yield strength (22,000 p.s.i.). The Mylar film bag may, for example, be suspended from the top of the tank (being held in place at all times by a slight positive pressure on the inside of the bag), and separated from the membrane 16 by a layer 73 of porous insulating material, e.g. fiberglass; when the tank is filled with liquid methane, the compression forces of the tank contents are transmitted outwardly through the Mylar film bag, which is thus effectively held in fully restrained condition against the fiberglass layer 73. The purpose of the fiberglass layer is to provide a space or passage for gas, between the Mylar film and low-expansion iron-nickel alloy membrane barriers, which may communicate with a locality external to the tank so that the gas therefrom may be monitored to detect the presence of leaks. Since the membrane 16 presents a smooth, flat surface without sharp edges or dishes, unlike a corrugated or dished metal membrane, it will not tend to tear the Mylar film bag even if the fiberglass layer 73 is omitted.

Alternatively, as illustrated in FIG. 8, the primary barrier of the tank may comprise a second fluid-impervious low-expansion iron-nickel alloy membrane 75 essentially identical to the membrane 16 and separated therefrom by a thin layer of insulating material, for example, a one-inch layer 76 of balsa wood. The balsa layer 76 may simply be glued to the inner surface of the membrane 16, and the inner membrane 75 may be glued to the balsa layer, the individual alloy sheets comprising the membrane 75 being joined directly to each other by lap or butt welds of low-expansion iron-nickel alloy. Another convenient arrangement for securing the inner membrane 75, as shown in FIG. 8, includes the provision of a T-shaped low-expansion iron-nickel alloy member 78 integral with each flat bar 50 and extending inwardly therefrom to provide a backing strip to which adjacent sheets of the inner membrane are welded with such alloy, the leg of the T proving a space for the balsa layer.

A modified form of double-carrier tank wall construction in accordance with the invention is shown in FIG. 9. In this embodiment, the inner shell 15 between the outer shell 14 (as represented by bulkhead 23) and the alloy membrane 16 includes a fluid-tight balsa wood insulating tank wall 80. The fluid-tight balsa wall is mounted on spaced timbers 82, corresponding to the timbers 35 in FIGS. 2–4, which are bolted to the outer shell 15 in the same manner as the latter timbers. For additional insulation, bats 83 of insulating material, e.g. fiberglass, are placed in the spaces between the timber 82.

Specifically, the fluid-tight balsa wall of FIG. 9 comprises large blocks 83 of balsa (e.g. 10′ x 5′ blocks 8 inches thick) secured to the timbers 82 and faced, on their inner surfaces, with a fluid-tight plywood layer 84; the interstices between blocks are sealed with plastic, as shown at 85, and are covered with plywood scabs 87 which lap the plywood facing layers 84 of adjacent balsa blocks, to provide a continuous fluid-impervious barrier entirely surrounding the tank interior. A non-tight balsa layer 89 is secured to the inner surface of the fluid-tight balsa wall 80; the alloy membrane 16 (which may be constructed as described above in connection with FIGS. 2–7) is secured flat against the inner surface of the layer 89 (which then constitutes the membrane-backing surface of the shell 15), in fully-restrained condition, for example by means of backing strips 50 and corner angle members (not shown) fixed in recesses routed out of the latter layer. Thus the alloy membrane 16 is the primary barrier, and the balsa wall 80 the secondary barrier, of the tank structure of FIG. 8.

A further alternative tank wall construction embodying the invention is shown in FIG. 10. In this wall structure, the inner shell 15 is constituted of a single, thick layer of polyurethane foam 90 providing both terminal insulation and a flat, non-resilient support surface for the alloy membrane 16. The polyurethane foam has adhesive properties and thus attaches itself adherently to the bulkhead 23. The membrane 16 is shown as secured to the inner shell 15 by means of flat bars 50 (as in FIGS. 2–4) which are attached to members 92, of wood or other strong, non-metallic structural material having appropriate properties, embedded in the foam layer 90 adjacent the inner surface thereof.

In the wall construction of FIG. 10, the foam layer 90 is not fluid-tight, and an additional fluid-impervious barrier (i.e. constituting the primary barrier of the tank) may be provided by a second membrane as shown for example in FIG. 2 or 8. Also, as shown in FIG. 11, the shell 15 comprising the polyurethane foam layer 90 may be provided as a secondary liquid-tight barrier, the inner surface of the foam layer being lined with a liquid-tight layer 94 of resin-impregnated glass cloth against which the alloy membrane 16 lies.

While the tank structure of the invention have been described above with particular reference to the transport of liquid methane in marine tanker vessels, tanks constructed in accordance with the invention may be used to contain other low-temperature liquids, for example such as liquefied helium, hydrogen, oxygen, nitrogen, ethane, propane and ammonia, e.g. at about 1 atm. pressure. That is to say, such tanks may be used, with the described advantages, where the range of temperatures encountered is that between ambient temperature and liquid-gas temperatures even very substantially lower than liquid methane temperature, for instance as in the case of liquid helium, which has a boiling point (at 1 atm. pressure) of about −452° F. Also, while the invention has been shown and described as embodied in marine vessel tanks having planar walls, in its broader aspects the invention also embraces stationary land storage tanks including tanks having cylindrical walls, references herein to a flat membrane 16 being intended to signify a membrane having a flat, i.e. smooth and continuous, cylindrical surface as well as a membrane having a flat planar surface.

It is to be understood that the invention is not limited to the feature and embodiments hereinabove specifically described, but may be carried out in other ways without departure from its spirit.

I claim:

1. In a tank for containing fluid at a temperature substantially below ambient temperature, in combination, a load-bearing and thermally insulating shell enclosing a tank chamber for receiving said fluid and having a substantially non-resilient smooth inner surface of material which has a thermal stress, for a temperature range between ambient temperature and the temperature of said fluid, substantially lower than the ultimate strength of said maerial; and a thin, flat, flexible fluid-impervious membrane of low-expansion iron-nickel alloy, facing said inner surface of said shell in essentially continuous engagement therewith, and fixedly secured to said shell in fully-restrained condition, to provide a continuous fluid-tight inner lining for said shell, said membrane being smooth and uncorrugated over substantially its entire surface and lying at all points in direct contact with and against the smooth inner surface of said insulating shell.

2. In a tank for containing fluid at a temperature substantially below ambient temperature, in combination, a rigid load-bearing outer shell enclosing a tank chamber for receiving said fluid; a heat-insulating inner shell mounted in load-transmitting engagement with the inner surface of said outer shell, thermally insulating said chamber from said outer shell and providing a substantially smooth non-resilient inner wall for said chamber of non-metallic material which has a thermal stress, for a temperature range between about −260° F. and about +70° F., substantially lower than the ultimate strength of said material; and a membrane of low-expansion iron-nickel alloy facing the inner surface of said inner wall in essentially continuous engagement therewith and fixedly secured to said inner wall in fully restrained condition, said membrane comprising thin, flat, flexible sheets of low-expansion iron-nickel alloy interconnected by fluid-tight joints of low-expansion iron-nickel alloy to provide a continuous fluid-tight inner lining for said inner wall, said membrane being smooth and uncorrugated over substantially its entire surface and lying at all points in direct contact with and against the smooth inner surface of said insulating shell.

3. In a tank for containing fluid at a temperature substantially below ambient temperature, in combination, a rigid load-bearing outer shell defining a flat-walled enclosure for receiving said fluid; a heat-insulating inner shell mounted in load-transmitting engagement with the inner surface of said outer shell, thermally insulating the interior of said enclosure from said outer shell and providing substantially non-resilient flat inner walls for said enclosure fabricated of non-metallic material which has a thermal stress, for a temperature range between about −260° F. and about +70° F., substantially lower than the ultimate strength of said material; and a membrane of low-expansion iron-nickel alloy facing the inner surface of said inner walls in continuous engagement therewith and fixedly secured to said inner wall in fully restrained condition, said membrane comprising flat, flexible sheets of low-expansion iron-nickel alloy having a thickness between about .002 inch and about ⅛ inch, interconnected by fluid-tight joints of low expansion iron-nickel alloy to provide a continuous fluid-tight inner lining for said inner walls, said inner wall being fabricated of wood, and said inner shell comprising, on each wall of said enclosure, a plurality of beams of wood fixedly mounted on the inner surface of said outer shell in spaced relation to each other; an inner wall of wood secured to said beams on the inner side thereof to provide a plurality of spaces defined by said beams, said outer shell, and said inner wall; and bodies of thermal insulating material filling said spaces.

4. In a marine tanker vessel for transporting liquefied gas at a temperature substantially below ambient temperature, said vessel having a hull structure, the combination therewith of a tank for containing said liquefied gas, said tank comprising a rigid load-bearing outer shell integral with said hull structure and enclosing a tank chamber for receiving said liquefied gas; a heat-insulating inner shell mounted in load-transmitting engagement with the inner surface of said outer shell, thermally insulating said chamber from said hull structure and providing a substantially non-resilient inner wall for said chamber of non-metallic material which has a thermal stress, for a temperature range between about −260° F. and about +70° F., substantially lower than the ultimate strength of said material; and a membrane of low-expansion iron-nickel alloy facing the inner surface of said inner wall in essentially continuous engagement therewith and fixedly secured to said inner wall in fully restrained condition, said membrane comprising thin, flat, flexible sheets of low-expansion iron-nickel alloy interconnected by fluid-tight joints of low-expansion iron-nickel alloy to provide a continuous inner lining for said inner wall, as a fluid-impervious barrier for said tank, a second fluid-impervious barrier surrounding said chamber, said last barrier being an integral portion of said inner shell, said inner shell comprising blocks of balsa wood fixedly secured to the inner surface of said outer shell, liquid-tight sealing joints between said blocks, a liquid-tight facing of wood secured to the inner surface of said blocks and covering said sealing joints, and a layer of balsa wood constituting said substantially non-resilient inner wall, secured to said facing and having an essentially flat inner surface.

5. In a marine tanker vessel for transporting liquefied gas at a temperature substantially below ambient temperature, said vessel having a hull structure, the combination therewith of a tank for containing said liquefied gas, said tank comprising a rigid load-bearing outer shell constituting an integral portion of said hull structure and defining a flat-walled enclosure for receiving said liquefied gas; a substantially non-resilient inner wall of wood, providing flat inner wall surfaces surrounding said enclosure; load-transmitting mounting means securing said inner wall to said outer shell in spaced facing relation to the inner surface of said outer shell; a thermal insulating medium interposed between said inner wall and said outer shell; and a membrane of low-expansion iron-nickel alloy facing said inner wall surfaces in continuous engagement therewith to provide a continuous fluid-tight inner lining for said inner wall, said membrane comprising a plurality of panels of flat, flexible low-expansion iron-nickel alloy sheet having a thickness between about .002 inch and about ⅛ inch, disposed on said inner wall surfaces with edges of adjacent panels in closely spaced parallel relation, and a panel-connecting joint structure of flat-surfaced low-expansion iron-nickel alloy bar members extending along said inner wall surface in engagement with the parallel edges of adjacent sheets and being secured to said edges with fluid-tight low-expansion iron-nickel alloy welds, and said bars being secured to said inner wall to secure said membrane thereto in fully-restrained condition.

6. A tank as defined in claim 5, including a continuous fluid-impervious membrane of laminated sheets of polyethylene terephthalate film disposed within said low-expansion iron-nickel alloy membrane and separated therefrom by a layer of a porous thermal insulating medium.

References Cited

UNITED STATES PATENTS

| | | | |
|---|---|---|---|
| 3,039,418 | 6/1962 | Versluis | 220—9 X |
| 3,079,026 | 2/1963 | Dosker | 220—9 |
| 3,224,621 | 12/1965 | Upthegrove | 220—9 |

FOREIGN PATENTS

| | | |
|---|---|---|
| 213,782 | 2/1961 | Austria. |
| 860,815 | 2/1961 | Great Britain. |
| 860,816 | 2/1961 | Great Britain. |
| 898,267 | 2/1962 | Great Britain. |

GEORGE E. LOWRANCE, Primary Examiner

U.S. Cl. X.R.

220—15